(12) United States Patent
Anspaugh et al.

(10) Patent No.: US 6,655,715 B2
(45) Date of Patent: Dec. 2, 2003

(54) MOUNTING APPARATUS FOR MOTOR VEHICLE STEERING COLUMN

(75) Inventors: Michael Patrick Anspaugh, Bay City, MI (US); Thomas M. Tighe, Saginaw, MI (US); Marc William Heinzman, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/892,936

(22) Filed: Jun. 27, 2001

(65) Prior Publication Data

US 2003/0001375 A1 Jan. 2, 2003

(51) Int. Cl.[7] ................................................. B62D 1/11
(52) U.S. Cl. ......................................... 280/777; 74/492
(58) Field of Search ............................... 280/777, 775, 280/779; 74/495, 493; 188/371, 376; B62D 1/19

(56) References Cited

U.S. PATENT DOCUMENTS

| 3,392,599 | A | | 7/1968 | White | |
|---|---|---|---|---|---|
| 3,476,345 | A | * | 11/1969 | Ristau | ........................ 248/548 |
| 3,702,081 | A | | 11/1972 | Arnston | |
| 3,747,427 | A | * | 7/1973 | Milton et al. | .................. 74/492 |
| 5,390,955 | A | * | 2/1995 | Kaliszewski et al. | ........ 280/777 |
| 6,398,259 | B1 | * | 6/2002 | Palmer et al. | .............. 280/777 |
| 6,435,555 | B1 | * | 8/2002 | Seamon et al. | ............. 280/777 |
| 6,494,488 | B1 | * | 12/2002 | Jurik et al. | .................. 280/777 |
| 2002/0121771 | A1 | * | 9/2002 | Shifflett et al. | ............. 280/779 |

* cited by examiner

Primary Examiner—Paul N. Dickson
Assistant Examiner—Ruth Ilan
(74) Attorney, Agent, or Firm—Michael D. Smith

(57) ABSTRACT

A plastic honey comb mounting bracket having a center passage surrounds a mast jacket of the steering column. The top of the plastic mounting bracket is clamped flush against a flat panel on a body of the motor vehicle by a pair of spring washers supported below respective ones of a pair of platforms on the mounting bracket by a pair of rigid studs on the vehicle body. The rigid studs are exposed through a pair of vertical slots in the mounting bracket. In some embodiments the spring washers release the plastic mounting bracket for linear translation as a unit with the mast jacket with the path traversed by the mast jacket being defined by the vertical slots in the mounting bracket. In another embodiment, the plastic mounting bracket remains stationary and the path traversed by the mast jacket during its collapse stroke is defined by the center passage in the plastic mounting bracket.

4 Claims, 2 Drawing Sheets

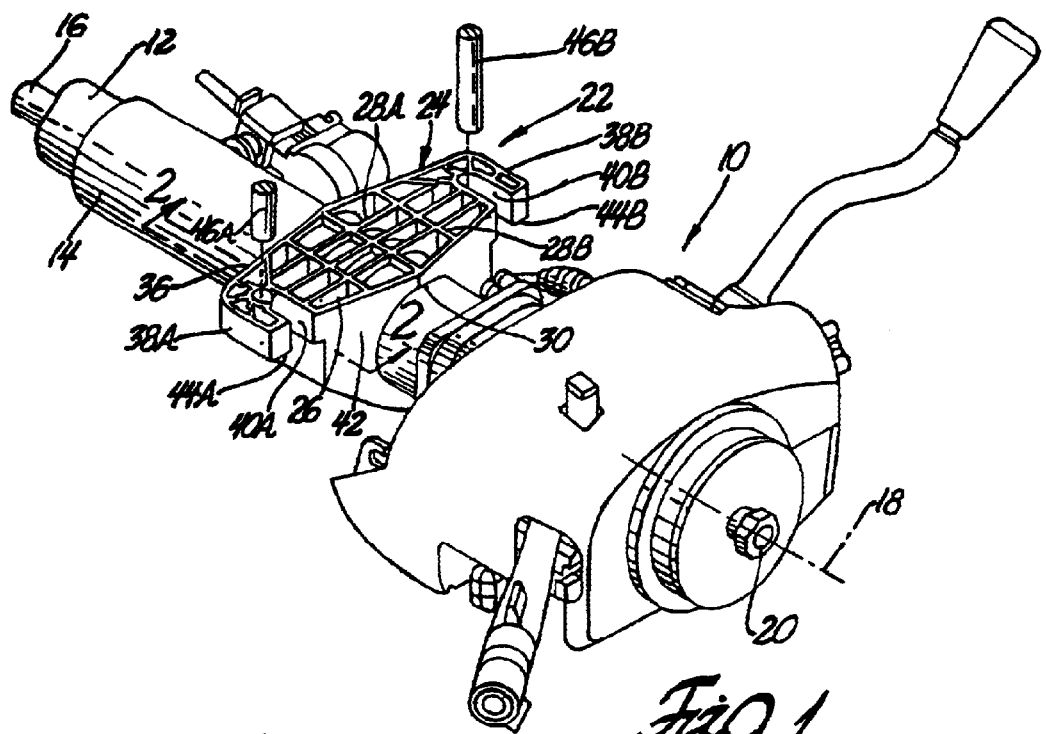
Fig.1
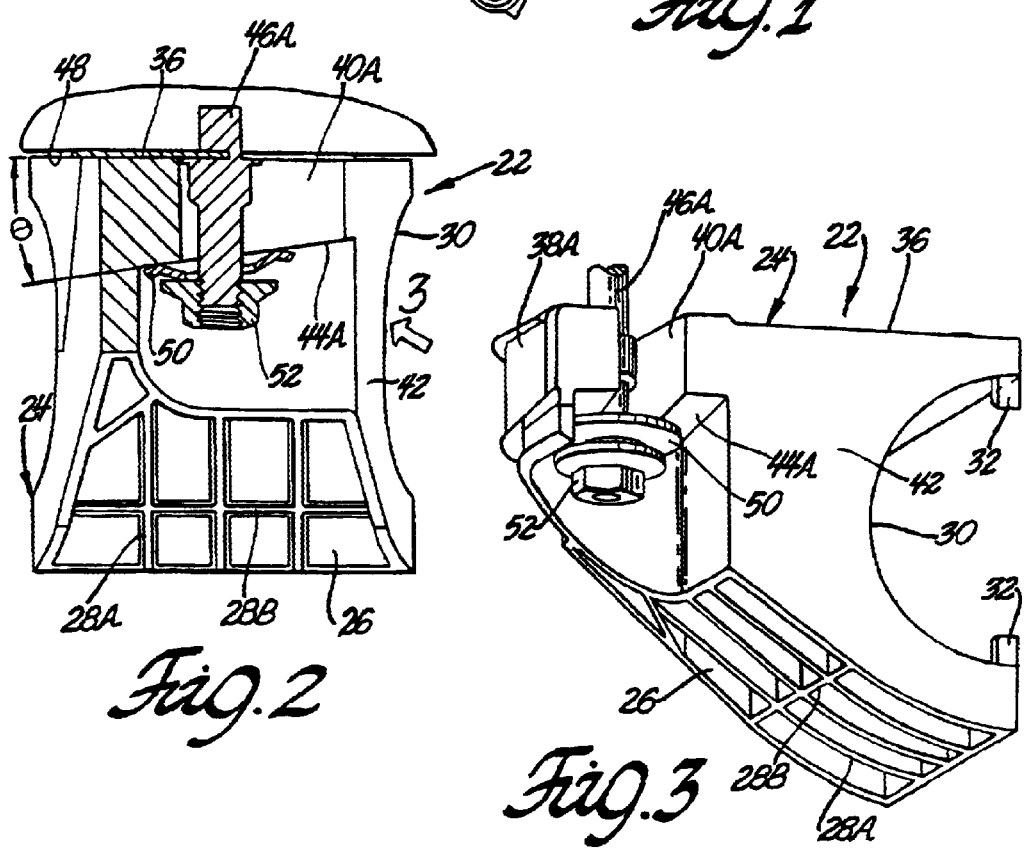
Fig.2
Fig.3

MOUNTING APPARATUS FOR MOTOR VEHICLE STEERING COLUMN

TECHNICAL FIELD

This invention relates to a mounting apparatus for an energy absorbing motor vehicle steering column.

BACKGROUND OF THE INVENTION

A mounting apparatus for an energy absorbing motor vehicle steering column described in U.S. Pat. No. 3,702,081 includes a metal mounting bracket rigidly attached to a tubular mast jacket of the steering column and a pair of metal capsules in slots in the mounting bracket. Each capsule is secured to the mounting bracket by a plurality of injection molded plastic pins and rigidly clamped to a body of the motor vehicle by hanger bolts. A force attributable to an impact on the steering column fractures the injection molded plastic pins and releases the mounting bracket from the capsules for linear translation as a unit with the mast jacket through an energy absorbing collapse stroke of the latter. After the mounting bracket releases from the capsules it engages a channel-shaped guide on the vehicle body above the steering column which defines the path followed by the mast jacket during its collapse stroke. In the interval before the mounting bracket engages the channel-shaped guide, the path traversed by the mast jacket is uncontrolled. A mounting apparatus according this invention positively controls the path of the mast jacket from the onset of its energy absorbing collapse stroke and is, therefore, an improvement over the mounting apparatus described in the aforesaid U.S. Pat. No. 3,702,081.

SUMMARY OF THE INVENTION

This invention is a new and improved mounting apparatus for an energy absorbing motor vehicle steering column including a molded structural plastic honey comb mounting bracket having a center passage therethrough around a mast jacket of the steering column. The top of the plastic mounting bracket is clamped flush against a flat panel on a body of the motor vehicle by a pair of spring washers supported below respective ones of a pair of platforms on the mounting bracket by a pair of rigid studs on the vehicle body. The rigid studs are exposed through a pair of vertical slots in the mounting bracket facing an upper or outboard end of the steering column. In some embodiments of the mounting apparatus according to this invention, the spring washers release the plastic mounting bracket for linear translation as a unit with the mast jacket through an energy absorbing collapse stroke of the latter with the path traversed by the mast jacket being defined by the vertical slots in the mounting bracket and the flat panel above the mounting bracket. In another embodiment of the mounting apparatus according to this invention, the plastic mounting bracket remains stationary and the path traversed by the mast jacket during its collapse stroke is defined by the center passage in the plastic mounting bracket.

BRIEF DESCRIPTION OF THE DRAWINGS

FIG. 1 is a fragmentary perspective view of a mounting apparatus according to this invention for an energy absorbing motor vehicle steering column;

FIG. 2 is an enlarged sectional view taken generally along the plane indicated by lines 2—2 in FIG. 1;

FIG. 3 is a fragmentary perspective view taken generally in the direction indicated by arrow "3" in FIG. 2;

DESCRIPTION OF THE PREFERRED EMBODIMENT

Figure 4:
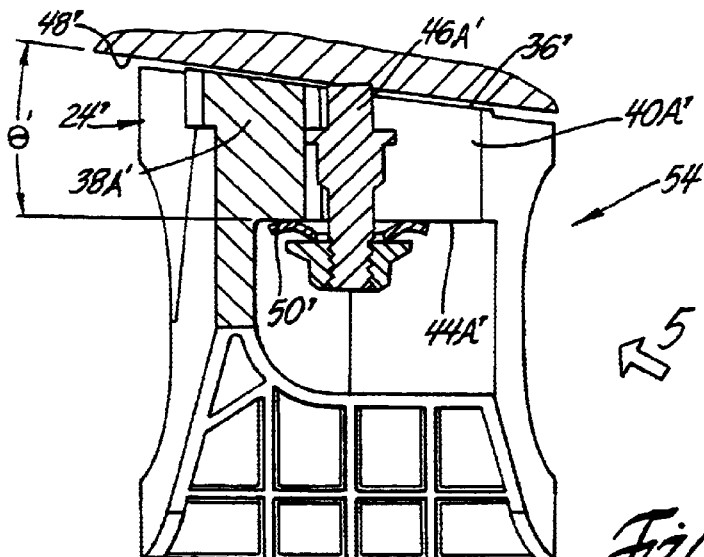
FIG. 4 is a sectional view similar to FIG. 2 of a modified mounting apparatus according to this invention for an energy absorbing motor vehicle steering column.

Referring to FIGS. 1–3, a fragmentarily illustrated energy absorbing motor vehicle steering column 10 includes a tubular lower mast jacket 12, a tubular upper mast jacket 14 telescopically overlapping the lower mast jacket, and an energy absorber, not shown, between the upper and lower mast jackets such as described in U.S. Pat. No. 3,392,599, the disclosure of which is incorporated herein by reference. A steering shaft 16 is supported on the upper and the lower mast jackets for rotation about a longitudinal centerline 18 of the steering column. A steering hand wheel, not shown, is attached to an upper or outboard end 20 of the steering shaft 16 in conventional fashion.

A longitudinal vector component of a force on the steering column attributable to an impact on the steering hand wheel induces telescopic linear translation of the upper mast jacket over the lower mast jacket through an energy absorbing collapse stroke and is reacted to a body of the motor vehicle through a bracket, not shown, at the bottom of the lower mast jacket. A mounting apparatus 22 according to this invention supports the upper mast jacket 14 vertically on the motor vehicle body, releases the upper mast jacket for energy absorbing collapse, and defines the path traversed by the upper mast jacket throughout its energy absorbing collapse stroke.

The mounting apparatus 22 includes a mounting bracket 24 made of molded structural plastic having a plurality of honey comb cells 26 defined between a plurality of integral lateral and longitudinal partitions 28A,28B. The structural rigidity of the plastic mounting bracket attributable to the cellular honey comb structure thereof is comparable to the structural rigidity of the metal mounting bracket in the mounting apparatus described in the aforesaid U.S. Pat. No. 3,702,081. Importantly, the plastic mounting bracket is substantially more economical to manufacture than and weighs less than the metal mounting bracket and, therefore, is an improvement over the metal mounting bracket.

The lateral and longitudinal partitions 28A,28B are interrupted by a cylindrical passage 30 through the plastic mounting bracket 24 which fits closely around the upper mast jacket 14 of the steering column, FIG. 1. The cylindrical passage 30 is interrupted by a plurality of schematically represented abutments 32 on the plastic mounting bracket which seat in corresponding ones of a plurality of sockets, not shown, in the upper mast jacket and couple the plastic mounting bracket to the upper mast jacket for unitary linear translation therewith through its collapse stroke. The plastic mounting bracket is molded as a unit around the upper mast jacket.

The plastic mounting bracket 24 has a flat top 36 and a pair of lateral flanges 38A,38B on opposite sides of the upper mast jacket. The lateral flanges 38A,38B are interrupted by respective ones of a pair of vertical slots 40A,40B each open through a vertical side 42 of the plastic mounting bracket facing the steering hand wheel on the upper end 20 of the steering shaft 16. The vertical slots 40A,40B intersect the flat top 36 of the plastic mounting bracket and respective ones of a pair of slanted platforms 44A,44B on the lateral flanges 38A,38B around the slots constituting the bottoms of the lateral flanges. The plane of the slanted platforms 44A,44B intercepts an angle θ with the plane of the flat top 36 of the plastic mounting bracket.

An attachment means of the mounting apparatus 22 includes a pair of vertical screw-threaded studs 46A,46B on opposite sides of the steering column closely received in respective ones of the vertical slots 40A,40B and rigidly attached to a schematically represented flat panel 48, FIG. 2, of the body of the motor vehicle above the steering column. A pair of spring washers 50 are retained on respective ones of the vertical studs 46A,46B below the slanted platforms 44A,44B by corresponding ones of a pair of screw-threaded retainers 52 on the studs which thus cooperate with the studs and the spring washers in supporting the upper mast jacket 14 vertically on the body of the motor vehicle. When the screw-threaded retainers 52 are tightened on the vertical studs 46A,46B, the spring washers 50 are resiliently flexed against the slanted platforms 44A,44B and clamp the flat top 36 of the plastic mounting bracket flush against the flat panel 48 on the motor vehicle body. At the same time, friction between the plastic mounting bracket and the spring washers and the flat panel attributable to the clamping forces applied by the spring washers resists linear translation of the upper mast jacket 14 relative to the body of the motor vehicle.

When the motor vehicle on which the steering column 10 is vertically supported by the mounting apparatus 22 impacts another object, the steering hand wheel on the upper end 20 of the steering shaft is commonly impacted by the operator of the motor vehicle. In addition to the aforesaid longitudinal vector component which induces telescopic linear translation of the upper mast jacket 14 over the lower mast jacket 12, the impact on the steering hand wheel typically also has vertical and lateral vector components which urge upward and lateral pivotal movement of the steering column about the bracket at the bottom of the lower mast jacket.

The longitudinal vector component of the impact is initially resisted by the aforesaid friction between the plastic mounting bracket, the spring washers, and flat panel. When that vector component exceeds the friction force, linear translation of the upper mast jacket 14 in its energy absorbing collapse stroke commences. From the onset of the collapse stroke of the upper mast jacket, the vertical vector component of the impact on the steering column is reacted to the vehicle body through the flat top 36 of the plastic mounting bracket and the flat panel 48 on the body which thereby cooperate in defining the vertical position of the upper mast jacket during its collapse stroke. Importantly, because of the angle θ between the plane of the slanted platforms 44A,44B and the flat top 36 of the plastic mounting bracket, the spring washers separate quickly from the platforms for minimum interference with the collapse stroke of the upper mast jacket. At the same time, the lateral vector component of the impact on the steering column is reacted to the vehicle body through the sides of the vertical slots 40A,40B in the plastic mounting bracket and the vertical studs 46A,46B which thereby cooperate in defining the lateral position of the upper mast jacket during its collapse stroke. The flat top 36 and the flat panel 48, therefore, cooperate with the vertical studs 46A,46B and the vertical slots 40A,40B in constituting a guide means of the mounting apparatus which positively defines the path traversed by the upper mast jacket relative to the motor vehicle body during its energy absorbing collapse stroke. The path thus defined is calculated to promote optimum energy absorbing performance of the steering column.

Figure 5:
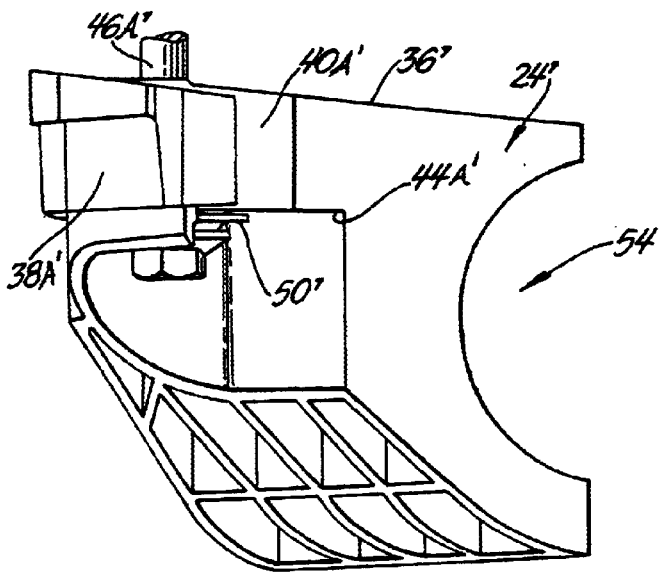
FIG. 5 is a fragmentary perspective view taken generally in the direction indicated by arrow "5" in FIG. 4.

A modified mounting apparatus 54 according this invention is illustrated in FIGS. 4–5 in which structural features common to both the modified mounting apparatus 54 and the mounting apparatus 22 are identified by primed reference characters. In the modified mounting apparatus 54, the plastic mounting bracket 24' on the upper mast jacket 14 has a slanted flat top 36' facing a similarly slated flat panel 48' on the body of the motor vehicle above the steering column and a pair of horizontal platforms around respective ones of a pair of vertical slots in corresponding ones of a pair of lateral flanges of the plastic mounting bracket, only the horizontal flat platform 44A' around the vertical slot 40A' in the lateral flange 38A' being visible in FIGS. 4–5. The slanted flat top 36' and the slanted flat panel 48' intercept an angle θ' with the plane of the horizontal platforms. The plastic mounting bracket 24' is supported vertically on a vehicle body with its slanted flat top clamped against the slanted flat panel by a pair of spring washers on a corresponding pair of vertical studs on the vehicle body, only the spring washer 50' on the vertical stud 46A' in the vertical slot 40A' in the plastic mounting bracket being visible in FIGS. 4–5.

A longitudinal vector component of an impact on the steering hand wheel is initially resisted by friction between the plastic mounting bracket 24', the spring washers 50', and the slanted flat panel 48'. When that vector component exceeds the friction force, linear translation of the upper mast jacket 14 in its energy absorbing collapse stroke commences. A vertical vector component of the impact on the steering column is reacted to the vehicle body through the slanted flat top of the plastic mounting bracket and the slanted flat panel on the vehicle body which thereby cooperate in defining the vertical position of the upper mast jacket during its collapse stroke. Importantly, because of the angle θ', the spring washers separate quickly from the horizontal platforms for minimum interference with the collapse stroke of the upper mast jacket. At the same time, a lateral vector component of the impact on the steering column is reacted to the vehicle body through the sides of the vertical slots in the plastic mounting bracket and the vertical studs which thereby cooperate in defining the lateral position of the upper mast jacket during its collapse stroke.

Figure 6:
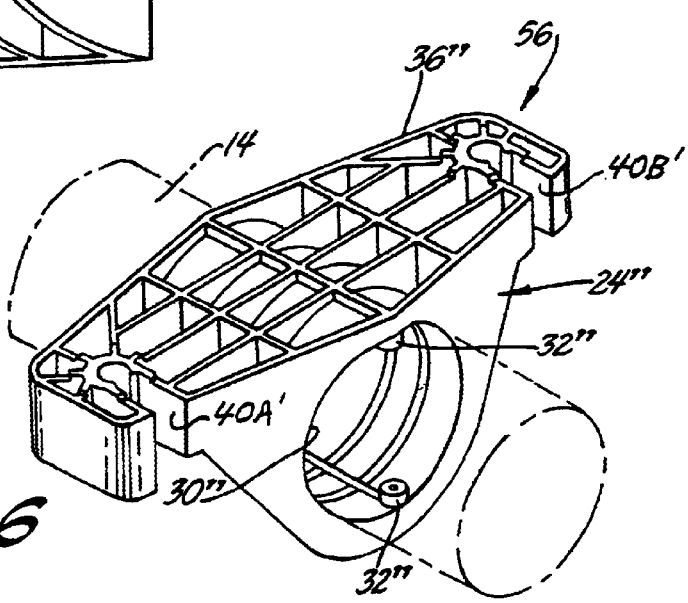
FIG. 6 is a fragmentary perspective view of a second modified mounting apparatus according to this invention for an energy absorbing motor vehicle steering column.

A second modified mounting apparatus 56 according this invention is illustrated in FIG. 6 in which structural features common to both the second modified mounting apparatus 56 and the mounting apparatus 22 are identified by double primed reference characters. In the second modified mounting apparatus, the plastic mounting bracket 24" is molded as a single structural element around the upper mast jacket 14 with the pair of schematically represented abutments 32" in the cylindrical passage 30" through the bracket received in corresponding sockets, not shown, in the upper mast jacket. The plastic mounting bracket 24" is rigidly vertically supported on the body of the motor vehicle on a pair of vertical studs, not shown, in the pair of vertical slots 40A",40B" in the plastic mounting bracket.

A longitudinal vector component of an impact on the steering hand wheel is initially resisted by the schematically represented abutments 32" which are designed to fracture substantially concurrent with the impact so that the plastic mounting bracket remains stationary as linear translation of the upper mast jacket 14 in its energy absorbing collapse stroke commences through the center passage 30" which then constitutes a slide bearing for the upper mast jacket. Because the energy absorber between the upper and the lower mast jackets rigidly resists relative linear translation therebetween except during an impact on the steering column, the schematically represented abutments 32" may be eliminated if desired.

A vertical vector component of the impact on the steering column is reacted to the vehicle body through the flat top 36" of the plastic mounting bracket clamped against a flat panel, not shown, on the vehicle body so that the center passage 30" defines the vertical position of the upper mast jacket during its collapse stroke. At the same time, a lateral vector component of the impact on the steering column is reacted to the vehicle body through the mounting bracket and the vertical studs so that the center passage 30" also defines the lateral position of the upper mast jacket during its collapse stroke. The path traversed by the upper mast jacket 14 during its energy absorbing collapse stroke is thus positively defined by the second modified mounting apparatus 56 and calculated to promote optimum energy absorbing performance of the steering column.

Having thus described the invention, what is claimed is:

1. A mounting bracket for a steering column having a mast jacket and a longitudinal axis, comprising:

an integral molded plastic mounting bracket which is rigidly attached to the mast jacket having a peripheral side wall extending between a top and a bottom and surrounding a plurality of integral lateral and longitudinal partitions defining a plurality of honeycomb cells extending between and open to the top and open to the bottom, a center passage through the side wall and honeycomb cells to receive the mast jacket with the honeycomb cells extending above and below said center passage, said bracket including a pair of integral lateral flanges located on opposite sides of the center passage with the side wall extending about said flanges, each flange having a slot formed therein which extends generally parallel to the longitudinal axis of the mast jacket to the front surface of the bracket, said honeycomb cells extending into said flanges to at least partially surround said slot between the slot and the side wall.

2. The invention of claim 1, wherein each of the pair of lateral flanges has an attachment surface and wherein the attachment surface and the top surface are oriented at an angle θ opening toward the rear surface relative to one another.

3. A mounting apparatus for an energy absorbing motor vehicle steering column including a lower mast jacket and an upper mast jacket supported on the lower mast jacket for linear translation relative thereto in the direction of a longitudinal centerline of the steering column in response to a longitudinal vector component of an impact on the steering column comprising:

a honeycomb molded plastic mounting bracket having a center passage around the upper mast jacket and a planar top above the upper mast jacket and a pair of lateral flanges on opposite sides of the upper mast jacket;

an attachment means operative to couple the plastic mounting bracket to the upper mast jacket for linear translation as a unit therewith relative to the lower mast bracket;

a pair of platforms on the plastic mounting bracket each defining a lower side of a corresponding one of the pair of lateral flanges of the plastic mounting bracket, a pair of vertical slots in respective ones of the pair of lateral flanges of the plastic mounting bracket each open through a side of the plastic mounting bracket facing an upper end of the energy absorbing steering column and intersecting the planar top of the plastic mounting bracket and the corresponding one of the pair of platforms;

a pair of vertical studs extending through respective ones of the vertical slots in the plastic mounting bracket, a planar panel on a body of a motor vehicle above the upper mast jacket; and a pair of springs retained on respective ones of the vertical studs below and bearing resiliently against corresponding ones of the pair of platforms on the plastic mounting bracket thereby to clamp the planar top of the plastic mounting bracket against the planar panel on the motor vehicle body to vertically support the upper mast jacket on the motor vehicle body to release the plastic mounting bracket through the pair of vertical slots therein for linear translation as a unit with the upper mast jacket in response the longitudinal vector component of the impact on the steering column;

a vertical vector component of the impact on the steering column being reacted to a motor vehicle body from the onset of linear translation of the upper mast jacket through the planar top of the plastic mounting bracket and the planar panel on the motor vehicle body and a lateral vector component of the impact on the steering column being reacted to the motor vehicle body from the onset of linear translation of the upper mast jacket through the sides of the pair of vertical slots in the plastic mounting bracket and the pair of vertical studs on the motor vehicle body thereby to positively define the path of an energy absorbing collapse stroke of the upper mast jacket relative to the vehicle body.

4. The mounting apparatus for an energy absorbing motor vehicle steering column recited in claim 3 wherein:

the plane of each of the pair of platforms on the plastic mounting bracket intercepts at an angle θ with the plane of the planar top of the plastic mounting bracket to promote rapid separation of each of the pair of springs from the corresponding one of the pair of platforms at the onset of linear translation of the plastic mounting bracket as a unit with the upper mast jacket relative to the lower mast jacket.

* * * * *